US011371710B2

(12) United States Patent
Bulat

(10) Patent No.: US 11,371,710 B2
(45) Date of Patent: Jun. 28, 2022

(54) GAS TURBINE COMBUSTOR ASSEMBLY WITH A TRAPPED VORTEX FEATURE

(71) Applicant: Siemens Energy Global GmbH & Co. KG, Munich (DE)

(72) Inventor: Ghenadie Bulat, Lincoln (GB)

(73) Assignee: SIEMENS ENERGY GLOBAL GMBH & CO. KG, Munich (DE)

(*) Notice: Subject to any disclaimer, the term of this patent is extended or adjusted under 35 U.S.C. 154(b) by 33 days.

(21) Appl. No.: 16/643,938

(22) PCT Filed: Sep. 3, 2018

(86) PCT No.: PCT/EP2018/073633
§ 371 (c)(1),
(2) Date: Mar. 3, 2020

(87) PCT Pub. No.: WO2019/048387
PCT Pub. Date: Mar. 14, 2019

(65) Prior Publication Data
US 2021/0071870 A1 Mar. 11, 2021

(30) Foreign Application Priority Data
Sep. 5, 2017 (EP) .................... 17189385

(51) Int. Cl.
*F02C 3/20* (2006.01)
*F02C 3/30* (2006.01)
(Continued)

(52) U.S. Cl.
CPC ................. *F23R 3/36* (2013.01); *F02C 3/20* (2013.01); *F02C 3/30* (2013.01); *F23R 3/16* (2013.01);
(Continued)

(58) Field of Classification Search
CPC .... F23R 2900/00015; F23R 3/58; F23R 3/36; F23R 3/16; F23R 3/28; F23R 3/346;
(Continued)

(56) References Cited

U.S. PATENT DOCUMENTS 5,199,255 A  4/1993 Sun et al.
5,272,867 A  12/1993 Emsperger
(Continued)

FOREIGN PATENT DOCUMENTS

CN  1467407 A  1/2004
CN  101529163 A  9/2009
(Continued)

OTHER PUBLICATIONS

International search report and written opinion dated Oct. 31, 2018, for corresponding PCT/EP2018/073633.

*Primary Examiner* — William H Rodriguez

(57) ABSTRACT

A combustor assembly of a gas turbine engine having a trapped vortex feature to reduce emissions where the trapped vortex is formed using ammonia injected into an annular cavity located in a wall surrounding a combustion chamber of the combustor assembly. The annular cavity, and therefore the trapped vortex, is positioned such that when the combustion occurs within the combustion chamber the position of the annular cavity, and therefore of the trapped vortex, is downstream of a flame front. The emissions resulting from combustion travel through the combustion chamber and pass by the annular cavity before exiting the combustion chamber. The trapped vortex in the combustion chamber supplies $NH_2$ radicals, resulting from the ammonia of the trapped vortex, to the passing by emissions and converts NOx and/or $N_2O$ in the emissions to non-polluting products, mainly water and nitrogen.

18 Claims, 7 Drawing Sheets

(51) Int. Cl.
*F23R 3/36* (2006.01)
*F23R 3/46* (2006.01)
*F23R 3/16* (2006.01)
*F23R 3/28* (2006.01)

(52) U.S. Cl.
CPC ................. *F23R 3/28* (2013.01); *F23R 3/46* (2013.01); *F23R 2900/00015* (2013.01)

(58) Field of Classification Search
CPC .... F23R 3/20; F23R 3/286; F23R 3/46; F02C 3/20; F02C 3/30
See application file for complete search history.

(56) References Cited

U.S. PATENT DOCUMENTS

| | | | | |
|---|---|---|---|---|
| 6,735,949 | B1* | 5/2004 | Haynes | F23R 3/283 60/746 |
| 8,272,219 | B1* | 9/2012 | Johnson | F23R 3/50 60/746 |
| 2002/0061271 | A1 | 5/2002 | Zauderer | |
| 2002/0112482 | A1* | 8/2002 | Johnson | F23R 3/16 60/776 |
| 2008/0271703 | A1* | 11/2008 | Armstrong | F23R 3/002 123/263 |
| 2011/0061390 | A1 | 3/2011 | Kendrick | |
| 2011/0061395 | A1* | 3/2011 | Kendrick | F23D 14/64 60/772 |
| 2011/0185735 | A1* | 8/2011 | Snyder | F23R 3/50 60/746 |
| 2012/0196234 | A1* | 8/2012 | Bulat | F23R 3/343 431/13 |
| 2013/0139515 | A1* | 6/2013 | Schlak | F01D 15/02 60/772 |
| 2013/0213052 | A1* | 8/2013 | Brickwood | F23N 5/242 60/776 |
| 2014/0331678 | A1 | 11/2014 | Cramer | |
| 2014/0360195 | A1* | 12/2014 | Beran | F23R 3/28 60/734 |
| 2017/0009598 | A1* | 1/2017 | Bulat | G01N 29/07 |
| 2017/0009993 | A1 | 1/2017 | Monahan et al. | |
| 2018/0172277 | A1* | 6/2018 | Bulat | F23R 3/14 |
| 2018/0188084 | A1 | 7/2018 | Yogo et al. | |
| 2018/0195723 | A1* | 7/2018 | Bulat | F23R 3/14 |
| 2018/0195724 | A1* | 7/2018 | Bulat | F23R 3/14 |
| 2018/0320900 | A1* | 11/2018 | Duncan | F23R 3/50 |
| 2019/0086092 | A1* | 3/2019 | Boardman | F23R 3/52 |

FOREIGN PATENT DOCUMENTS

| | | |
|---|---|---|
| CN | 102149915 A * | 8/2011 |
| CN | 102818285 A | 12/2012 |
| CN | 203835539 U | 9/2014 |
| CN | 105051458 A | 11/2015 |
| EP | 1659338 A1 | 5/2006 |
| EP | 1659388 A1 | 5/2006 |
| EP | 2192347 A1 | 6/2010 |
| EP | 2735799 A2 | 5/2014 |
| GB | 2544552 A | 5/2017 |
| RU | 2613100 C2 | 3/2017 |
| WO | 2007082608 A1 | 7/2007 |
| WO | 2010141777 A1 | 12/2010 |
| WO | 2015051226 A1 | 4/2015 |
| WO | 2017005694 A1 | 1/2017 |
| WO | 2017056694 A1 | 4/2017 |

\* cited by examiner

GAS TURBINE COMBUSTOR ASSEMBLY WITH A TRAPPED VORTEX FEATURE

CROSS REFERENCE TO RELATED APPLICATIONS

This application is the US National Stage of International Application No. PCT/EP2018/073633 filed 3 Sep. 2018, and claims the benefit thereof. The International Application claims the benefit of European Application No. EP17189385 filed 5 Sep. 2017. All of the applications are incorporated by reference herein in their entirety.

FIELD OF INVENTION

The present invention relates to techniques for reducing emissions from combustors in gas turbine engines, and more particularly to methods and combustor assemblies using trapped vortex for reducing NOx emissions in gas turbine engines.

BACKGROUND OF INVENTION

Gas turbines are commonly used in industrial applications. To achieve the goal of an environmental friendly operation of the gas turbine, the gas turbine may be operated in a DLE (dry low emission) combustion mode, wherein the gas turbine produces low emissions, especially low NOx emissions. NOx is the generic term for the nitrogen oxides that are most relevant for air pollution, namely nitric oxide (NO) and nitrogen dioxide ($NO_2$). To achieve this goal, a good and uniform mixing of air and fuel in a combustor of the gas turbine has to be achieved.

Generally, combustion hardware, such as combustor assembly, for gas turbine engines is designed for a specific fuel for example natural gas, diesel, syngas, landfill gas and other hydrocarbon fuels with varying Wobbe Index. However, for a hardware that was originally designed for one fuel and later when operated on a different fuel, the optimal operation will often be missed resulting in flashback (flame burning on the combustor surface), flameout (engine shutdown), combustion dynamics (hardware integrity), high pressure drop (performance loss) or high emissions.

Low NOx-emission combustors utilize reduced peak flame temperatures within the combustor to limit the formation of thermal NOx through staging strategies such as lean premixed combustion. As combustion temperatures are decreased in low NOx applications, several other undesirable combustion phenomena become more prevalent and must be addressed. The low-NOx limit is often bounded by the onset of combustion instability in the form of Lean Blow Out (LBO) also known as flameout. Lean Blow Out occurs when the thermal energy generated by the burning fuel/air mixture is no longer sufficient to heat the incoming fuel-air mixture to the ignition point.

Several conventional approaches run the engine close to the Lean Blow Off limit. Generally, the fuel will be introduced in multiple fuel injection holes and with differing staging across the load range. A pilot/primary fuel injection is used to control and stabilize locally the flame, thus avoiding the LBO. Fuel schedule map or intelligent control of the fuel splits such as in WO2007/082608 are generally used to determine the running path of the engine across the load range. However, these methods do not allow in all situations to reliably operate the gas turbine, in order to achieve high efficiency and low emissions.

Thus, there exists a need for a technique, particularly a combustor assembly and a method for using such a combustor assembly, for gas turbines, that allows an efficient combustion and at the same time having low emissions.

SUMMARY OF INVENTION

Thus the object of the present invention is to provide technique, particularly a combustor assembly and a method for using such a combustor assembly, for gas turbines, that allows an efficient combustion and at the same time having low emissions.

The above objects are achieved by a method for operating a combustor assembly of a gas turbine of the present technique, and a combustor assembly for a gas turbine of the present technique. Advantageous embodiments of the present technique are provided in dependent claims.

In a first aspect of the present technique a method for operating a combustor assembly for a gas turbine engine is presented. In the method, at least a first fuel is combusted in a reaction zone of a combustion chamber of the combustor assembly. The reaction zone has a reaction zone front. Simultaneously or subsequently to combusting the first fuel, ammonia is injected into the combustion chamber to form a trapped vortex in the combustion chamber. The ammonia is injected such that the trapped vortex is formed in the combustion chamber at a position downstream of the reaction zone front.

At reaction zone, resulting from the combustion of the first fuel, working gas, also known as combustion gas or combustion products, is generated. The combustion products include emissions, particularly NOx and/or $N_2O$. The emissions then flow downstream, along with the other combustion products, through the combustion chamber towards a transition duct positioned adjacent to the combustor assembly. The emission on their downstream journey pass by, i.e. flow adjacent to, the annular cavity, and therefore by the trapped vortex, which is positioned downstream of the reaction zone front or in other words downstream of a flame front, before exiting the combustion chamber. The trapped vortex in the combustion chamber supplies $NH_2$ radicals, resulting from the ammonia injected into the annular cavity, to the passing by emissions and converts the NOx and $N_2O$ to non-polluting products, mainly water and nitrogen. Thus the emissions, particularly the NOx and/or $N_2O$ are reduced in the combustion products and consequently in the exhaust of the gas turbine engine.

In an embodiment of the method, the first fuel includes or is one of Hydrogen, a hydrocarbon, a mixture of hydrocarbons, Ammonia, and a combination thereof. Thus the present method may be used for a variety of fuels of different types.

In another embodiment of the method, combusting at least the first fuel includes combusting at least a second fuel. The method further includes injecting the second fuel into the combustion chamber such that the second fuel enters the reaction zone. The second fuel is less reactive than the first fuel. Furthermore, combusting the first fuel includes injecting the first fuel into the combustion chamber such that the first fuel enters the reaction zone. The first fuel and the second fuel are injected such that the first and the second fuels are premixed with a first and a second air flows forming a first and a second premixing stream lines, respectively, before the first and the second fuels enter the reaction zone. Each of the premixing stream lines begins with a beginning of the premixing of the fuel with the respective air flow and ends at a location where the fuel enters the reaction zone. Thus each of the first and the second premixing stream lines are substantially formed in the combustion chamber, however, a part of the one or both of the premixing stream lines may extend to an outside of the combustion chamber, for example a part of the one or both of the premixing stream lines may extend into a swirler.

A length of the second premixing stream line is greater than a length of the first premixing stream line. Thus the two fuels, namely the first and the second fuel are premixed independently and therefore a desired optimal premixing of each fuel stream with air is achieved. This results in a stable flame that is tolerant to load changes or changes of the ratio of the first fuel and second fuel. Furthermore, because of the desired premixing of each fuel lean fuel combustion is achieved that results in low emissions, in particular of $NO_x$. The lowering of the emissions by use of the two independently premixed fuels, with desired premixing owing to different lengths of the premixing streamlines, supplements the lowering of the emission achieved by the aforementioned ammonia injection by trapped vortex.

In another embodiment of the method, the first fuel includes or is one of Hydrogen, a hydrocarbon such as methane, a mixture of hydrocarbons such as natural gas, and a combination thereof. The second fuel includes or is a hydrocarbon such as methane, a mixture of hydrocarbons such as natural gas, ammonia, and a combination thereof. The first fuel increases the flame stability. The first fuel also enables the combustion of the low reactive fuel such as ammonia gas when being used as the second fuel.

In another embodiment of the method, combusting at least the first fuel includes combusting at least a third fuel. The method further includes injecting the third fuel into the combustion chamber such that the third fuel enters the reaction zone. The third fuel is less reactive than the second fuel. The third fuel is injected such that the third fuel is premixed with a third air flow forming a third premixing stream line before the third fuel enters the reaction zone. The third premixing stream line begins with a beginning of the premixing of the third fuel with the third air flow and ends at a location where the third fuel enters the reaction zone. Thus each of the first, the second and the third premixing stream lines are substantially formed in the combustion chamber, however, a part of the one or more of the premixing stream lines may extend to an outside of the combustion chamber, for example a part of the one or more of the premixing stream lines may extend into a swirler.

A length of the third premixing streamline is greater than the length of the second premixing stream line. Thus the three fuels, namely the first, the second and the third fuels are premixed independently and therefore a desired optimal premixing of each fuel stream with air is achieved. This results in a stable flame that is tolerant to load changes or changes of the ratio of the fuels. Furthermore, because of the desired premixing of each fuel lean fuel combustion is achieved that results in low emissions, in particular of $NO_x$. The lowering of the emissions by use of the three independently premixed fuels, with desired premixing owing to different lengths of the premixing streamlines, supplements the lowering of the emission achieved by the aforementioned ammonia injection by trapped vortex.

In another embodiment of the method, the first fuel includes or is Hydrogen; the second fuel includes or is a hydrocarbon, e.g. methane, or a mixture of hydrocarbons e.g. natural gas; and the third fuel includes or is ammonia.

In another embodiment of the method, the combustor assembly used for the method has a combustor can, an annular cavity in the combustor can, and a prechamber having a prechamber exit. An axial distance of the annular cavity from the prechamber exit is equal to or greater than 50% of a length (L) of the combustor can, particularly between 50% and 75% of the length of the combustor can. In the method, the ammonia is injected into the combustor can such that the trapped vortex is formed in the annular cavity of the combustor can. In most modern day gas turbine engines the reaction zone or the flame is limited within the first half of the combustor can, and thus the relative position of the annular cavity with respect to the length of the combustor can as used for the present embodiment of the method ensures that the trapped vortex is formed upstream of the reaction zone front or the flame front.

In another aspect of the present technique, a combustor assembly for a gas turbine engine is presented. The combustor assembly includes a burner having a burner plate, a prechamber having a prechamber exit i.e. an outlet of the prechamber, a combustor can having a larger radial extent than the prechamber. The prechamber and the combustor can are both substantially tubular structures that extend from the burner plate towards a transition duct adjacent to the combustor assembly. The burner is followed by the prechamber which in turn is followed by the combustor can that ends at an inlet of the transition duct. An inlet of the combustor can is aligned with the outlet of the prechamber. In the combustor assembly, a combustion chamber is defined by the combustor can and the prechamber. The combustion chamber is configured to combust at least a first fuel in a reaction zone. The combustor assembly, hereinafter also referred to as the assembly, includes one or more first injectors that inject the first fuel into the combustion chamber. In the assembly, the combustor can include an annular cavity configured to maintain a trapped vortex, advantageously formed from ammonia gas and air mixture circulation within the annular cavity. An axial distance of the annular cavity from the prechamber exit is equal to or greater than 50% of a length of the combustor can, particularly between 50% and 75% of the length of the combustor can. In the gas turbine engines, the reaction zone or the flame is limited within the first half of the combustor can, and thus the relative position of the annular cavity with respect to the length of the combustor can ensures that the trapped vortex is formed upstream of the reaction zone front or the flame front. The trapped vortex may be supplied with any suitable compound such as ammonia gas that generates radicals that react with the emissions, especially with NOx and/or $N_2O$, and convert the emissions into non-polluting compounds.

In an embodiment, the combustor assembly includes an ammonia supply to the annular cavity such that the trapped vortex is formed in the annular cavity of the combustor can. Ammonia generates $NH_2$ radicals that react with the emissions, especially with NOx and/or $N_2O$, and convert the emissions into non-polluting compounds.

In an embodiment, the combustor assembly includes one or more second injectors, in addition to the first injectors. The second injectors inject a second fuel into the combustion chamber. The second fuel is less reactive than the first fuel. The assembly is adapted to premix the first and the second fuels with a first and a second air flows to form a first and a second premixing stream lines, respectively, before the fuels enter the reaction zone of the combustion chamber. Each of the first and the second premixing stream lines are formed in the combustion chamber, however, a part of the one or both of the premixing stream lines may extend to an outside of the combustion chamber, for example a part of the one or both of the premixing stream lines may extend into a swirler. Each of the premixing stream lines begins with a beginning of the premixing of the fuel with the respective air flow and ends at a location where the fuel enters the reaction zone. A length of the second premixing stream line is greater than a length of the first premixing stream line. Thus the combustor assembly is adapted to use two fuels, namely the first and the second fuel that are premixed independently within the combustor assembly and therefore a desired optimal premixing of each fuel stream with air is achieved, resulting into a stable flame that is tolerant to load changes or changes of the ratio of the first fuel and second fuel. Furthermore, because of the desired premixing of each fuel lean fuel combustion is achieved in the combustor assembly of the present technique that results in low emissions, in particular of $NO_x$. The lowering of the emissions by use of the two independently premixed fuels, with desired premixing owing to different lengths of the premixing streamlines achieved by the combustor assembly of the present technique, supplements the lowering of the emission achieved by the aforementioned trapped vortex maintained in the annular cavity.

In another embodiment, the combustor assembly includes a first fuel supply providing the first fuel to the one or more first injectors, and a second fuel supply providing the second fuel to the one or more second injectors. The first fuel includes or is one of Hydrogen, a hydrocarbon such as methane, a mixture of hydrocarbons such as natural gas, and a combination thereof. The second fuel includes or is a hydrocarbon such as methane, a mixture of hydrocarbons such as natural gas, ammonia, and a combination thereof.

In another embodiment, the combustor assembly includes one or more third injectors, in addition to the first and the second injectors. The third injectors inject a third fuel into the combustion chamber. The third fuel is less reactive than the second fuel. The combustor assembly is adapted to premix the third fuel with a third air flow to form a third premixing streamline before the third fuel enters the reaction zone of the combustion chamber. The third premixing stream line begins with a beginning of the premixing of the third fuel with the third air flow and ends at a location where the third fuel enters the reaction zone. Thus each of the first, the second and the third premixing stream lines are substantially formed in the combustion chamber, however, a part of the one or more of the premixing stream lines may extend to an outside of the combustion chamber, for example a part of the one or more of the premixing stream lines may extend into a swirler included within the combustor assembly.

A length of the third premixing streamline is greater than the length of the second premixing stream line. Thus the three fuels, namely the first, the second and the third fuels are premixed independently in the combustor assembly and therefore a desired optimal premixing of each fuel stream with air is achieved. This enables the combustor assembly to generate and maintain a stable flame that is tolerant to load changes or changes of the ratio of the fuels. Furthermore, because of the desired premixing of each fuel lean fuel combustion is achieved in the combustor assembly that results in low emissions, in particular of $NO_x$ from the combustor assembly. The lowering of the emissions by use of the three independently premixed fuels, with desired premixing owing to different lengths of the premixing streamlines, supplements the lowering of the emission achieved by the aforementioned trapped vortex maintained in the annular cavity.

In another embodiment, the combustor assembly includes a first fuel supply providing the first fuel to the one or more first injectors, a second fuel supply providing the second fuel to the one or more second injectors, and a third fuel supply providing the third fuel to the one or more third injectors. The first fuel includes or is Hydrogen; the second fuel includes or is a hydrocarbon, e.g. methane, or a mixture of hydrocarbons e.g. natural gas; and the third fuel includes or is ammonia.

In another embodiment, the combustor assembly the one or more first injectors are arranged on a front face of the prechamber. The front face of the prechamber is formed by the burner plate, thus in other words the first injectors are arranged on the surface of the burner plate facing the combustion chamber. The burner plate may be part of a pilot burner included in the combustor assembly. The combustor assembly also includes a downstream swirler and an upstream swirler. The downstream swirler includes the one or more second injectors, and introduces a mixture of the second fuel injected by the second injectors and the second air flow into the combustion chamber. The upstream swirler includes the one or more third injectors, and introduces a mixture of the third fuel injected by the third injectors and the third air flow into the combustion chamber. The downstream swirler and the upstream swirler are arranged about or around the prechamber.

In another embodiment of the combustor assembly, an aspect ratio of the annular cavity is 1:1 i.e. an axial length of the annular cavity and a radial length of the annular cavity i.e. in other words a depth of the annular cavity is in the ratio 1:1. This provides advantageous dimensions of the annular cavity.

BRIEF DESCRIPTION OF THE DRAWINGS

The above mentioned attributes and other features and advantages of the present technique and the manner of attaining them will become more apparent and the present technique itself will be better understood by reference to the following description of embodiments of the present technique taken in conjunction with the accompanying drawings, wherein.

DETAILED DESCRIPTION OF INVENTION

Figure 1:
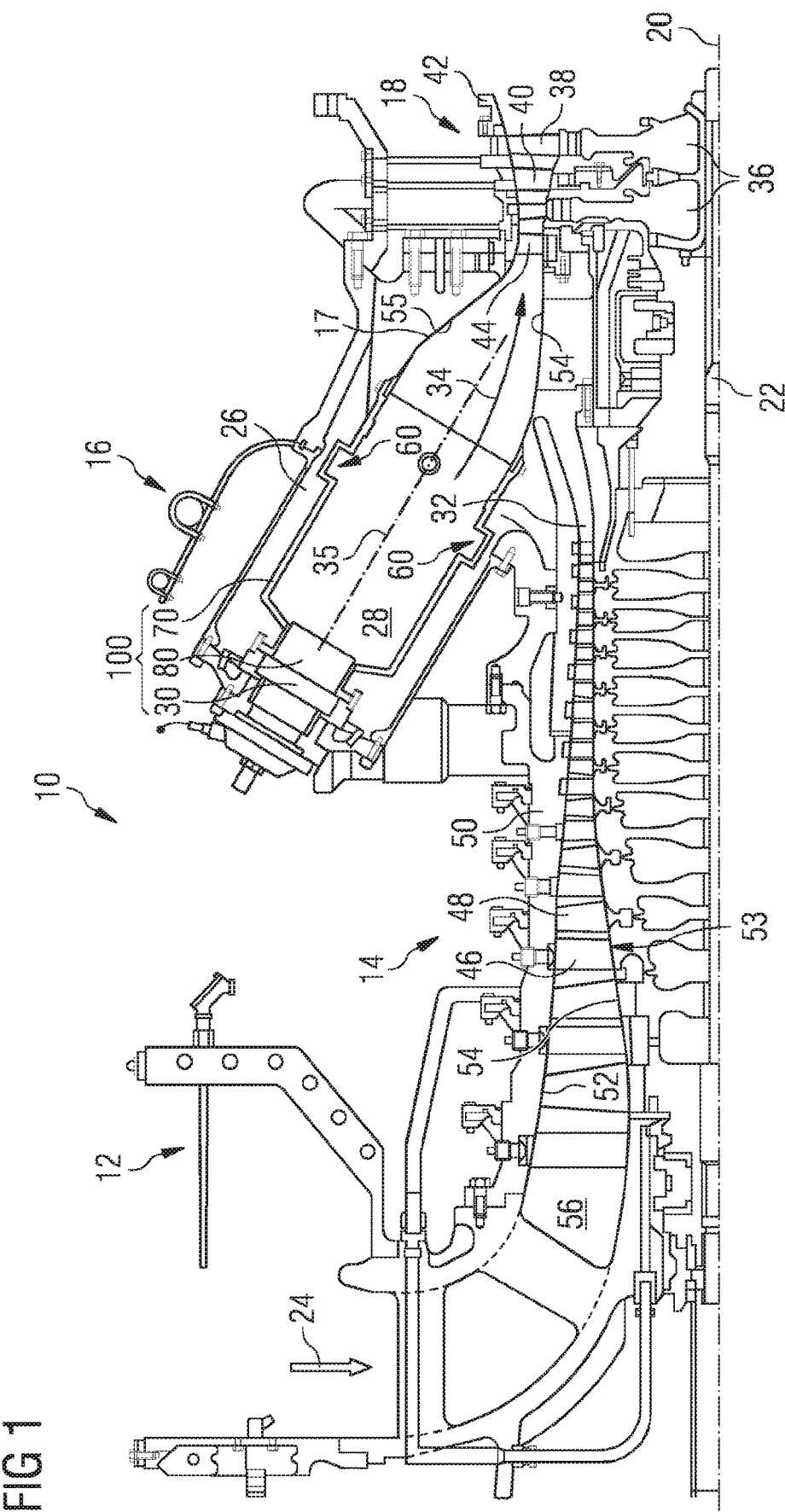
FIG. 1 schematically depicts a part of a gas turbine engine in a sectional view in which an exemplary embodiment of a combustor assembly of the present technique is integrated.

Hereinafter, above-mentioned and other features of the present technique are described in details. Various embodiments are described with reference to the drawing, wherein like reference numerals are used to refer to like elements throughout. In the following description, for the purpose of explanation, numerous specific details are set forth in order to provide a thorough understanding of one or more embodiments. It may be noted that the illustrated embodiments are intended to explain, and not to limit the invention. It may be evident that such embodiments may be practiced without these specific details.

It may be noted that in the present disclosure, the terms "first", "second", etc. are used herein only to facilitate discussion, and carry no particular temporal or chronological significance unless otherwise indicated.

The basic idea of the present technique is to use trapped vortex feature to reduce emissions from a combustor assembly of a gas turbine engine. The trapped vortex is formed using ammonia fed or injected into an annular cavity located in a wall surrounding a combustion chamber. The annular cavity, and therefore the trapped vortex, is positioned such that when the combustion occurs within the combustion chamber the position of the annular cavity, and therefore of the trapped vortex, is downstream of a flame front. In other words, the flame is upstream of the trapped vortex and thus emissions, NOx and $N_2O$, resulting from the combustion travel through the combustion chamber and pass by the annular cavity before exiting the combustion chamber. The trapped vortex in the combustion chamber supplies $NH_2$ radicals, resulting from the ammonia, to the passing by emissions and converts the NOx and $N_2O$ to non-polluting products, mainly water and nitrogen. Advantageously, besides being used in the trapped vortex, ammonia can also be used as a fuel in combustion and thus the emissions generated by ammonia fuel combustion are cleaned by the trapped vortex ammonia, thereby making the combustor assembly a self-cleaning system.

FIG. 1 shows an example of a gas turbine engine 10 in a sectional view in which a combustor assembly 100 of the present technique is incorporated. The gas turbine engine 10, hereinafter referred to as the engine 10, comprises, in flow series, an inlet 12, a compressor or compressor section 14, a combustor section 16 and a turbine section 18 which are generally arranged in flow series and generally about and in the direction of a longitudinal or rotational axis 20.

In operation of the engine 10, air 24, which is taken in through the air inlet 12 is compressed by the compressor section 14 and delivered to the combustion section or burner section 16. The combustion section 16 comprises a burner plenum 26 having a combustor assembly 100. The combustor assembly 100 extends along a longitudinal axis 35 of the combustor assembly 100 and includes one or more combustion chambers 28, generally defined or enclosed by a prechamber 80 and a combustor can 70, and at least one burner 30 fixed to each combustion chamber 28. The combustion chambers 28 and the burners 30 are located inside the burner plenum 26. The compressed air passing through the compressor 14 enters a diffuser 32 and is discharged from the diffuser 32 into the burner plenum 26 from where a portion of the air enters the burner 30 and is mixed with a gaseous or liquid fuel. The air/fuel mixture is then burned and the combustion gas 34 or working gas from the combustion is channeled through the combustion chamber 28 to the turbine section 18 via a transition duct 17.

The combustion gas 34, immediately after generation resulting from the combustion, includes NOx and/or $N_2O$ which is/are later on cleaned from the combustion gas before the combustion gas 34 exits the combustion chamber 28 and flows into the transition duct 17. The cleaning of the NOx and/or $N_2O$, hereinafter both referred together to as emissions, means reducing amounts or concentration of the emissions in the combustion gas 34. The emissions are removed, at least partly, from the combustion gas 34 by using a trapped vortex using ammonia gas. The trapped vortex is formed in an annular cavity 60 present in a wall surrounding the combustion chamber 28. The combustor assembly 100, including the annular cavity 60 and the trapped vortex, has been explained later in further details with reference to FIGS. 2 to 7.

This exemplary gas turbine engine 10 has a cannular combustor section arrangement 16, which is constituted by an annular array of combustor cans 19 each having the burner 30 and the combustion chamber 28, the transition duct 17 has a generally circular inlet that interfaces with the combustor chamber 28 and an outlet in the form of an annular segment. An annular array of transition duct outlets form an annulus for channeling the combustion gases to the turbine section 18.

The turbine section 18 comprises a number of blade carrying discs 36 attached to the shaft 22. In the present example, two discs 36 each carry an annular array of turbine blades 38. However, the number of blade carrying discs could be different, i.e. only one disc or more than two discs. In addition, guiding vanes 40, which are fixed to a stator 42 of the gas turbine engine 10, are disposed between the stages of annular arrays of turbine blades 38. Between the exit of the combustion chamber 28 and the leading turbine blades 38 inlet guiding vanes 44 are provided and turn the flow of working gas onto the turbine blades 38.

The combustion gas from the combustion chamber 28 enters the turbine section 18 and drives the turbine blades 38 which in turn rotate the shaft 22. The guiding vanes 40, 44 serve to optimise the angle of the combustion or working gas on the turbine blades 38.

The turbine section 18 drives the compressor section 14. The compressor section 14 comprises an axial series of vane stages 46 and rotor blade stages 48. The rotor blade stages 48 comprise a rotor disc supporting an annular array of blades. The compressor section 14 also comprises a casing 50 that surrounds the rotor stages and supports the vane stages 48. The guide vane stages include an annular array of radially extending vanes that are mounted to the casing 50. The vanes are provided to present gas flow at an optimal angle for the blades at a given engine operational point. Some of the guide vane stages have variable vanes, where the angle of the vanes, about their own longitudinal axis, can be adjusted for angle according to air flow characteristics that can occur at different engine operations conditions.

The casing 50 defines a radially outer surface 52 of the passage 56 of the compressor 14. A radially inner surface 54 of the passage 56 is at least partly defined by a rotor drum 53 of the rotor which is partly defined by the annular array of blades 48.

The present invention is described with reference to the above exemplary turbine engine having a single shaft or spool connecting a single, multi-stage compressor and a single, one or more stage turbine. However, it should be appreciated that the present invention is equally applicable to two or three shaft engines and which can be used for industrial, aero or marine applications.

Hereinafter, the terms upstream and downstream are in reference to the flow direction of the combustion gas 34 or the working gas 34 through the combustion chamber 28 and towards the transition duct 17, unless otherwise stated. The terms forward and rearward are also in reference to the flow direction of the combustion gas 34 or the working gas 34 through the combustion chamber 28 and towards the transition duct 17, unless otherwise stated. Hereinafter, the terms axial, radial and circumferential are made with reference to the longitudinal axis 35 of the combustion chamber 28.

It may be noted that in the present disclosure, the terms "first", "second", etc. are used herein only to facilitate discussion, and carry no particular temporal or chronological significance unless otherwise stated.

Figure 2:
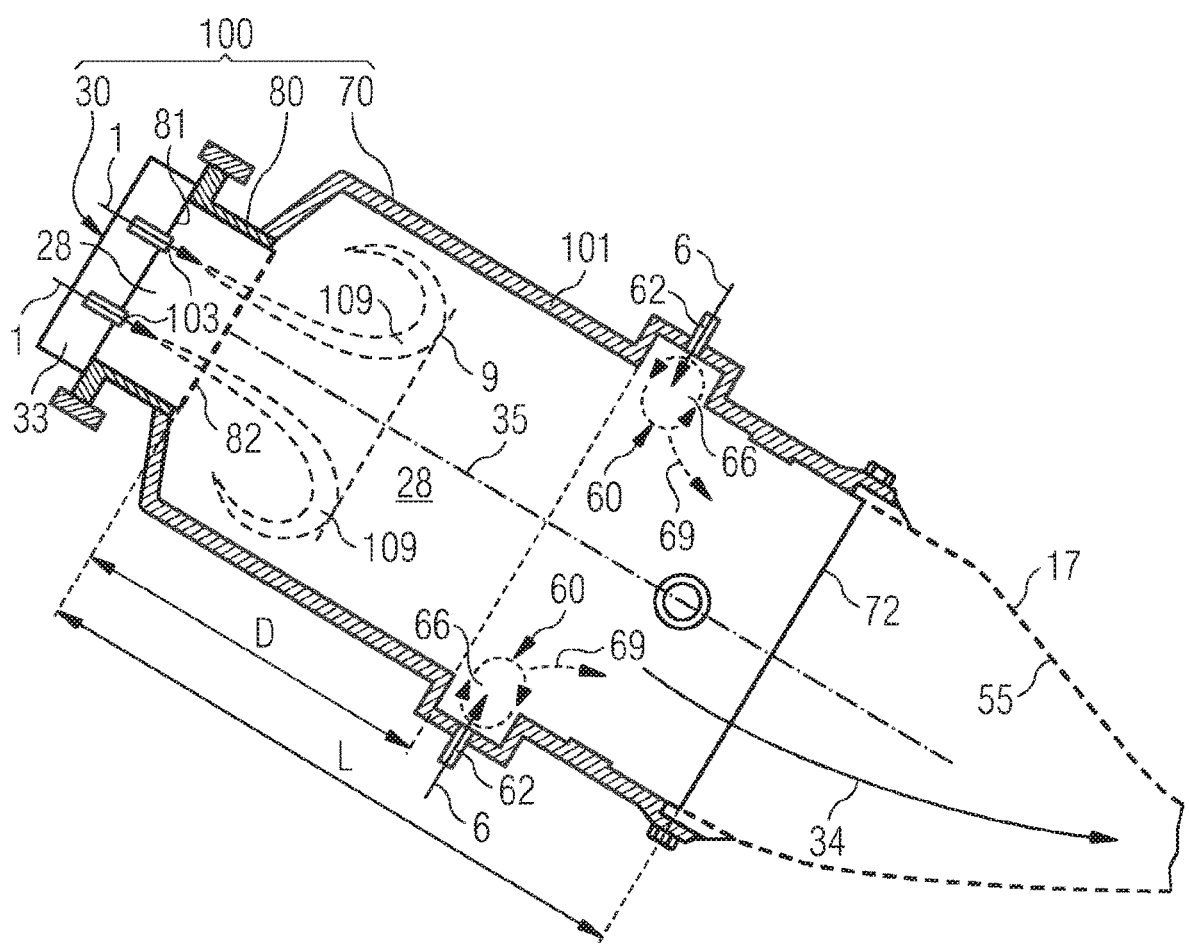
FIG. 2 schematically illustrates the combustor assembly of FIG. 1.

FIG. 2 schematically depicts an exemplary embodiment of the combustor assembly 100. The assembly 100 includes the burner 30 having a burner plate 33, the prechamber 80, and the combustor can 70 having a larger radial extent than the prechamber 80. As aforementioned, the combustion chamber 28 is defined by the combustor can 70 and the prechamber 80. The combustor chamber 28 extends along the longitudinal axis 35. Combustion of fuel, for example at least a first fuel 1, in the combustion section 16 takes place in the combustor chamber 28. The combustion takes place in a reaction zone 109, which is also referred to as a flame. The reaction zone 109 or the flame 109 has a reaction zone front 9 or flame front 9 which represents the most downstream location of the reaction zone 109 or the flame 109.

The burner plate 30 may include a pilot burner (not shown in FIG. 2) and the burner plate 33 may be a part of the pilot burner. The assembly 100 includes one or more first injectors 103 configured to inject the first fuel 1 into the combustion chamber 28. The first injectors 103 may be positioned in the burner plate 33. Aligned downstream to the burner 30, particularly the burner plate 33, is the prechamber 80. The prechamber 80 has a front face 81 which is the inlet of the prechamber 80. The front face 81 of the prechamber 80 is aligned with the burner plate 30, particularly with the burner plate 33. The prechamber 80 has a hollow axially extending generally cylindrical structure. The prechamber 80 includes a prechamber exit 82. The prechamber exit 82 is the outlet of the prechamber 80. Downstream of the prechamber exit 82 the combustor can 70 is aligned. The combustor can 70 and the prechamber 80 are generally coaxially arranged about the longitudinal axis 35. An inlet of the combustor can 70 is positioned at the prechamber exit 82, in other words the combustor can 70 starts or begins where the prechamber exit 82 is located. The combustor can 70 has a hollow axially extending generally cylindrical structure. The combustor can 70 includes an outlet 72 of the combustor can 70. Downstream of the outlet 72 of the combustor can 70 is the transition duct aligned.

In the assembly 100, the combustor can 70 includes an annular cavity 60. The annular cavity 60, hereinafter also referred to as the cavity 60, is oriented circumferentially around the longitudinal axis 35, hereinafter also referred to as the axis 35. The cavity 60 is realized in a wall 101 of the combustor can 70 surrounding the combustion chamber 28. The cavity 60 is formed as a radially extending depression in the wall 101. The cavity 60 is configured to maintain a trapped vortex 66. The trapped vortex 66 is an encircling or whirling mass of ammonia gas 6 which is substantially seated within the cavity 60. The ammonia gas 6, also referred simply to as ammonia 6 is provided to the cavity 60 by an ammonia supply 62. The ammonia 6 under the influence of the high mass flow of the combustion gas 34 is maintained as the trapped vortex 66 in the cavity 60.

An axial distance D of the annular cavity 60 from the prechamber exit 82 is equal to or greater than 50% of a length L of the combustor can 70, particularly between 50% and 75% of the length L of the combustor can 70. The length L of the combustor can 70 is an axial distance between the beginning of the combustor can 70, that is co-located or co-positioned with the prechamber exit 82, and the outlet 72 of the combustor can 70, that may be co-located or co-positioned with the an inlet (not shown) of the transition duct 17.

During operation of the gas turbine engine 10, i.e. in a method for operating the assembly 100, firstly the first fuel 1 is combusted in the reaction zone 109, and subsequently or simultaneously ammonia 6 is injected into the combustion chamber 28 to form the trapped vortex 66 in the combustion chamber 28. The ammonia 6 is injected such that the trapped vortex 66 is formed in the combustion chamber 28 at a position downstream of the reaction zone front 9. The first fuel includes or is one of Hydrogen, a hydrocarbon such as methane gas, a mixture of hydrocarbons such as natural gas, ammonia, or a combination thereof i.e. a mixture of two or more selected from Hydrogen, hydrocarbon such as methane gas, a mixture of hydrocarbons such as natural gas, and ammonia.

The reaction zone 109 is generally limited within first half of the combustor can 70, i.e. the reaction zone 109 or the flame 109 is generally contained within 50% of the length L of the combustor can 70. The combustion of the fuel, i.e. in example of FIG. 2 the first fuel 1, and optionally of a second fuel 2 (shown in FIGS. 3 to 6) and further optionally of a third fuel 3 (shown in FIGS. 3 to 6), generates the combustion products 34 or the combustion gas 34 which flows generally axially towards the transition duct 17. The combustion products 34, in addition to other compounds or substances, include pollutants such as NOx and/or $N_2O$ emissions. The combustion products 34 along with the pollutants flow from the reaction zone 109, particularly past the reaction zone front 9, and towards the outlet 72 of the combustor can 70. When the combustion products 34 pass by the cavity 60, which is intermediately positioned between the reaction zone front 9 and the outlet 72 of the combustor can 70, $NH_2$ radicals generated from the whirling ammonia 6 in the trapped vortex 66 get into contact with the pollutants such as NOx and/or $N_2O$, for example by flowing in a direction depicted in FIG. 2 by arrow marked by reference numeral 69. The $NH_2$ radicals react with the pollutants such as NOx and/or $N_2O$ to generate non-polluting products such as Nitrogen and water.

The exemplary embodiment of FIG. 2 of the combustor assembly 100 shows use of the trapped vortex 66 while using the first fuel 1, however the trapped vortex 66 can be used to reduce emissions from the combustor assembly 100 while using the second fuel 2, and optionally the third fuel 3, in addition to the first fuel 1. The principle of emissions reduction or working of the trapped vortex 66 in reducing emissions remains the same whether using one fuel, i.e. the first fuel 1, or using more than one fuel, i.e. the second fuel 2 or the second fuel 2 and the third fuel 3. Hereinafter the use of the combustor assembly 1 for the second fuel 2 in addition to the first fuel 1, and optionally for the third fuel 3 in addition to the second fuel 2, has been explained with reference to FIGS. 3 to 7, however, it may be noted by one skilled in the art that in all the cases the cavity 60 and the trapped vortex 66 formed and maintained within the cavity 60 are same structurally and functionally.

Figure 3:
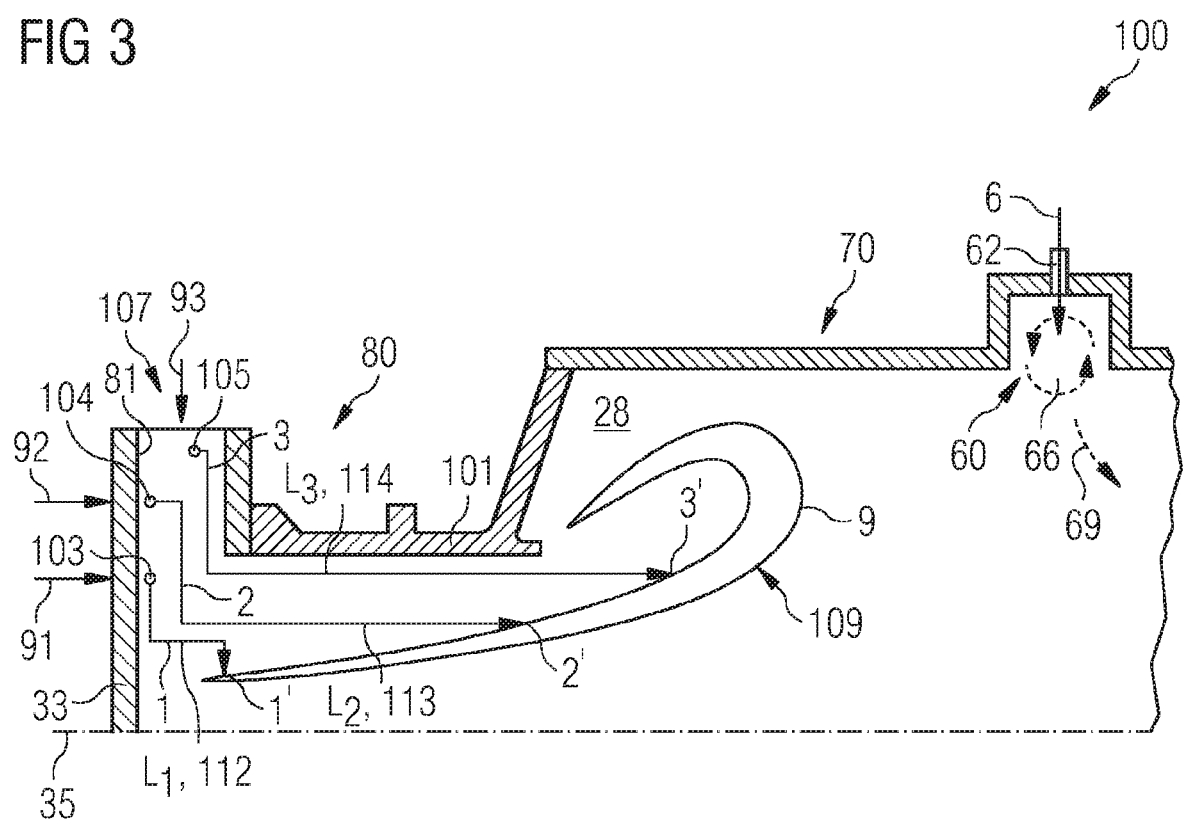
FIG. 3 schematically illustrates an exemplary embodiment of the combustor assembly of the present technique operable with two or more different fuels.
Figure 4:
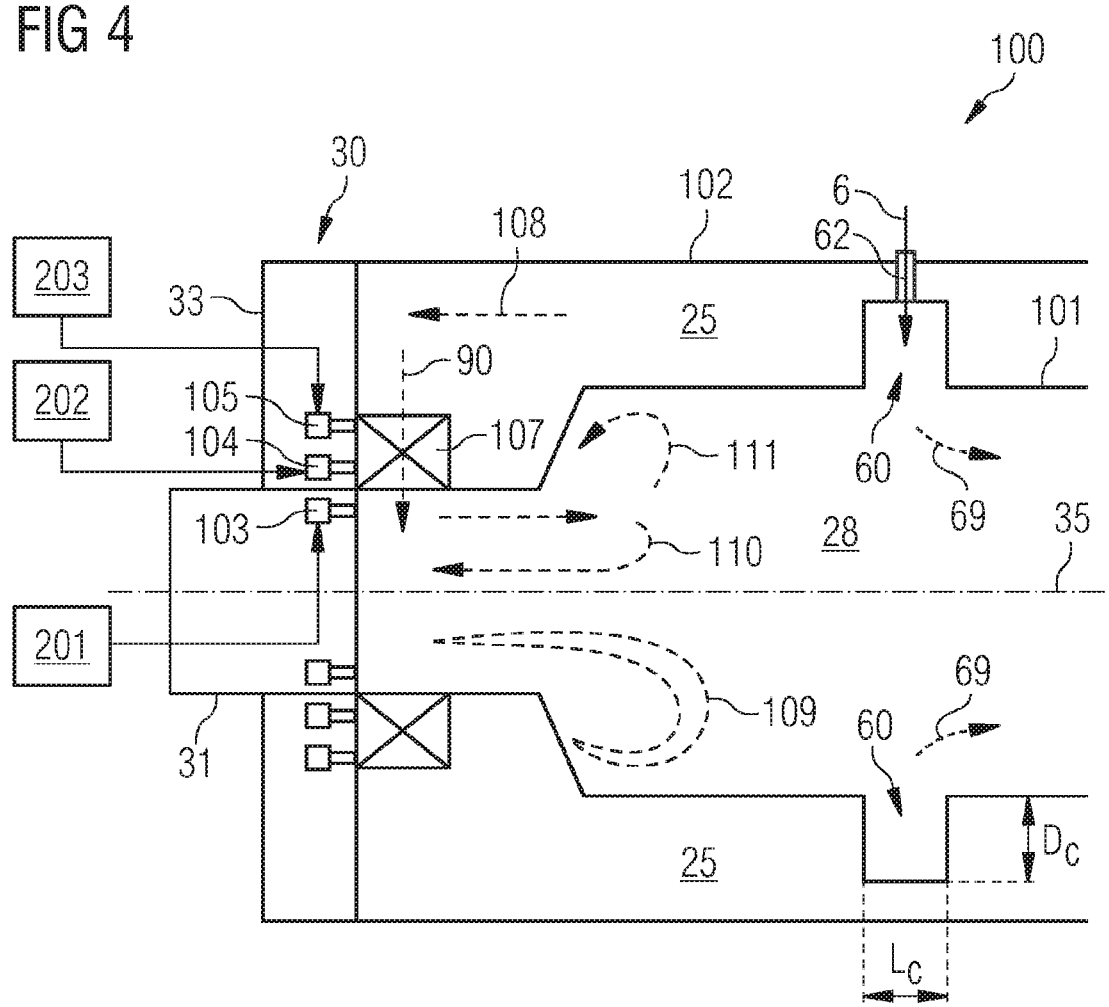
FIG. 4 schematically illustrates the combustor assembly of FIG. 3 depicting further structural details of the combustor assembly.

FIGS. 2, 3 and 4 show an exemplary embodiment of the assembly 100 having the wall 101, also referred to as the inner wall 101, that confines the combustion chamber 28 in a radial direction. Furthermore, the assembly 100 has the burner plate 33 that confines that combustion chamber 28 in an axial direction. As it can be seen in FIG. 4, the assembly 100 includes an outer wall 102 that is arranged radially outside of the inner wall 101. The inner wall 101 and the outer wall 102 may be rotationally symmetric around the axis 35. The air 24 (shown in FIG. 1) is streamed in a space 25 between the inner wall 101 and the outer wall 102 towards the burner plate 33 as indicated by an arrow 108, so that the inner wall 101 is cooled and the air 24 is preheated before it enters the combustion chamber 28. The inner wall 101 can also be a double skin arrangement for cooling efficiencies.

The assembly 100 includes the first injectors 103 adapted to inject the first fuel 1 into the combustion chamber 28 as aforementioned, and additionally includes one or more second injectors 104 adapted to inject the second fuel 2 into the combustion chamber 28 and one or more third injectors 105 adapted to inject the third fuel 3 into the combustion chamber 28. The second fuel 2 is less reactive than the first fuel 1 and the third fuel 3 is less reactive than the second fuel 2. This can be achieved for example, when the first fuel 1 is hydrogen, the second fuel 2 is natural gas and the third fuel 3 is ammonia gas. The assembly 100 includes a first fuel supply 201 that supplies the first fuel 1 to the first injectors 103, a second fuel supply 202 that supplies the second fuel 2 to the second injectors 104, and a third fuel supply 203 that supplies the third fuel 3 to the third injectors 105.

The assembly 100 is adapted to premix the first fuel 1 with a first air flow 91, the second fuel 2 with a second air flow 92, and the third fuel 3 with a third air flow 93. The air flows 91,92,93 may be supplied to the combustion chamber 28 independent of one another as depicted schematically in FIG. 3, or alternatively as depicted schematically in FIG. 4 together in form of a single air flow 90 directed through a swirler 107 included in the assembly 100. The swirler 107 is located axially on the burner plate 33 for swirling the air 24 before the air 24 enters the combustion chamber 28. After passing the space 25 the air 24 passes through the swirler 107 in a radially inward direction towards the axis 35 and enters the combustion chamber 28.

The first fuel 1, the second fuel 2, and the third fuel 3 are injected such that the first, the second, and the third fuels 1,2,3 are premixed with the first, the second and the third air flows 91,92,93, or parts of the air flow 90 designated as the first, the second and the third air flows 91,92,93, forming a first premixing stream line 112, a second premixing stream line 113, and a third premixing stream line 114, respectively, before the first, the second and the third fuels 1,2,3 enter the reaction zone 109.

Each of the premixing stream lines 112,113,114 begins with a beginning of the premixing of the fuel 1,2,3 with the respective air flow 91,92,93 and ends at a location, namely a first, a second and a third location 1',2',3', where the fuel 1,2,3 enters the reaction zone 109. The beginning of the premixing of the fuels 1,2,3 is generally the point of injection of the fuels 1,2,3 or in other words the position of location where the first, the second and the third injectors 103,104,105 are located.

The injectors 103, 104 and 105 are arranged in the burner plate 33, wherein the first injector 103 is located closer to the axis 35 than the second injector 104 and the second injector 104 is located closer to the axis 35 than the third injector 105. Therefore, the first fuel 1 is injected into the air flow 90 downstream in respect to the direction of the air flow 90 from where the second fuel 2 is injected into the air flow 90, so that the length $L_2$ of the second premixing stream line 113 is greater than the length $L_1$ of the first premixing stream line 112. Furthermore, the third injector 105 is located such that the third fuel 3 is injected into the air flow 90 upstream in respect to the direction of the air flow 90 from where the second fuel 2 is injected into the air flow 90, so that the length $L_3$ of the third premixing stream line 114 is greater than the length $L_2$ of the second premixing stream line 113.

The length $L_1$ of the first premixing stream line 112 is from 20 mm to 150 mm, in particular from 40 mm to 60 mm, the length $L_2$ of the second premixing stream line 113 is from 40 mm to 300 mm, in particular from 80 mm to 120 mm, and the length $L_3$ of the third premixing stream line 114 is from 60 mm to 400 mm, in particular from 125 mm to 175 mm.

It is conceivable that a multitude of first injectors 103 is arranged in the burner plate 33, each having the same distance to the axis 35. It is conceivable that a multitude of second injectors 104 is arranged in the burner plate 33, each having the same distance to the axis 35. It is conceivable that a multitude of third injectors 105 is arranged in the burner plate 33, each having the same distance to the axis 35. The assembly 100 including the first, the second and the third injectors 103,104,105 also includes, as aforementioned, the cavity 60 that maintains the trapped vortex 66, advantageously formed by ammonia 6 supplied to the cavity 60 via the ammonia supply 62.

The flame 109 in the combustion chamber 28 has an inner recirculation zone 110 that stabilises the flame 109 by transporting hot combustion products 34 to the unburned air/fuel mixture, and an outer recirculation zone 111.

The assembly 100 can be operated during an ignition process or during a part load operation of the gas turbine engine 10 such that only the first fuel 1 and/or second fuel 2 is injected into the combustion chamber 28. During a base load operation of the gas turbine engine 10 the third fuel 3 and at least one of the first fuel 1 and second fuel 2 is injected into the combustion chamber 28.

It is noteworthy that the assembly 100, particularly as described in the exemplary embodiment of FIGS. 3 and 4, may include the first injectors 103 and the second injectors 104, or alternatively the assembly 100, particularly as described in the exemplary embodiment of FIGS. 3 and 4, may include the first injectors 103, the second injectors 104, and the third injectors 105.

In the embodiment of assembly 100 that includes the first injectors 103 and the second injectors 104, without the third injectors 105, the assembly 100 may include the corresponding the first and the second fuel supplies 201, 202 that supply the first fuel 1 and the second fuel 2, respectively. The second fuel 2 is less reactive than the first fuel 1. The assembly 100 premixes the first and the second fuels 1,2 with the first and the second air flows 91,92 to form the first and the second premixing stream lines, 112,113 respectively, before the fuels 1,2 enter the reaction zone 109 of the combustion chamber 28. Each of the first and the second premixing stream lines 112,113 are formed in the combustion chamber 28, however, a part of the one or both of the premixing stream lines 112,113 may extend into the swirler 107, or in other words the one or both of the premixing stream lines 112,113 may begin within the swirler 107 and therefrom streamline into the combustion chamber 28. As aforementioned, the length $L_2$ of the second premixing stream line 113 is greater than the length $L_1$ of the first premixing stream line 112. The assembly 100 including the first and the second injectors 103,104 also includes, as aforementioned, the cavity 60 that maintains the trapped vortex 66, advantageously formed by ammonia 6 supplied to the cavity 60 via the ammonia supply 62.

In operating the assembly 100, another embodiment of the method of the present technique is presented. In the method along with combusting at least the first fuel 1, the second fuel 2 is also combusted in the reaction zone 109 of the combustion chamber 28. The first fuel 1 and the second fuel 2 are, separately or independently of each other, injected into the combustion chamber 28, for example via the first injectors 103 being positioned at the burner plate 33 and the second injectors being positioned on the burner plate 33 or at vanes of the swirler 107, such that the first fuel 1 and the second fuel 2 enter the reaction zone 109, at the first location 1' and the second location 2', advantageously distinct from each other. The first and the second premixing stream lines 112, 113 extend between the point or location or position of the first and the second injectors 103,104 and the first location 1' and the second location 2', and the length $L_2$ of the second premixing stream line 113 is greater than the length $L_1$ of the first premixing stream line 112.

In the assembly 100 with the first and the second injectors 103,104, and/or in the method using the first and the second fuels 1,2, the first fuel 1 includes or is one of Hydrogen, a hydrocarbon such as methane, a mixture of hydrocarbons such as natural gas, and a combination thereof. The second fuel 2 includes or is a hydrocarbon such as methane, a mixture of hydrocarbons such as natural gas, ammonia, and a combination thereof.

Hereinafter, FIGS. 5 to 7 have been referred to explain another exemplary embodiment of the assembly 100, and the method of the present technique.

Figure 5:
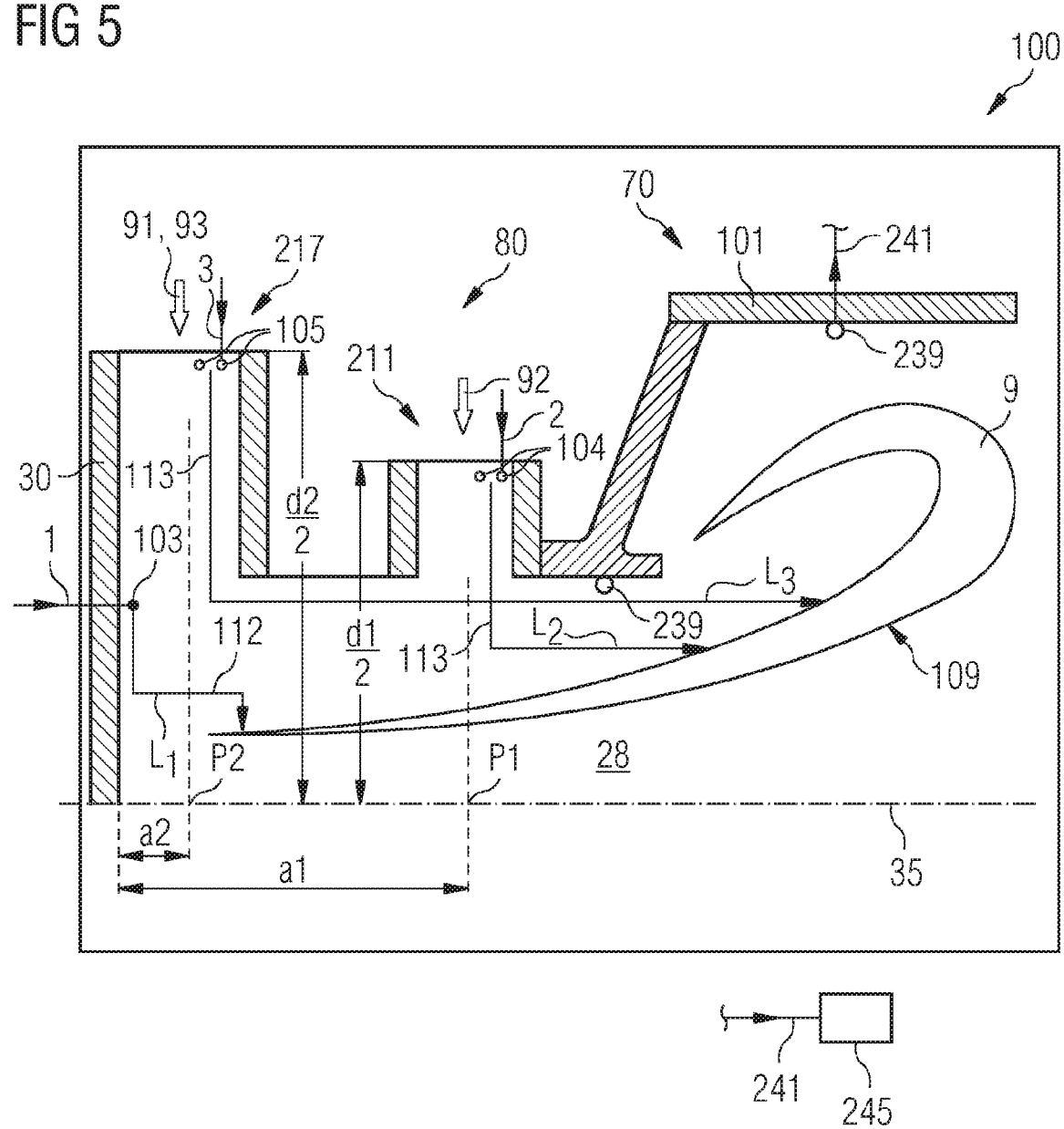
FIG. 5 schematically illustrates another exemplary embodiment of the combustor assembly of the present technique operable with two or more different fuels.
Figure 6:
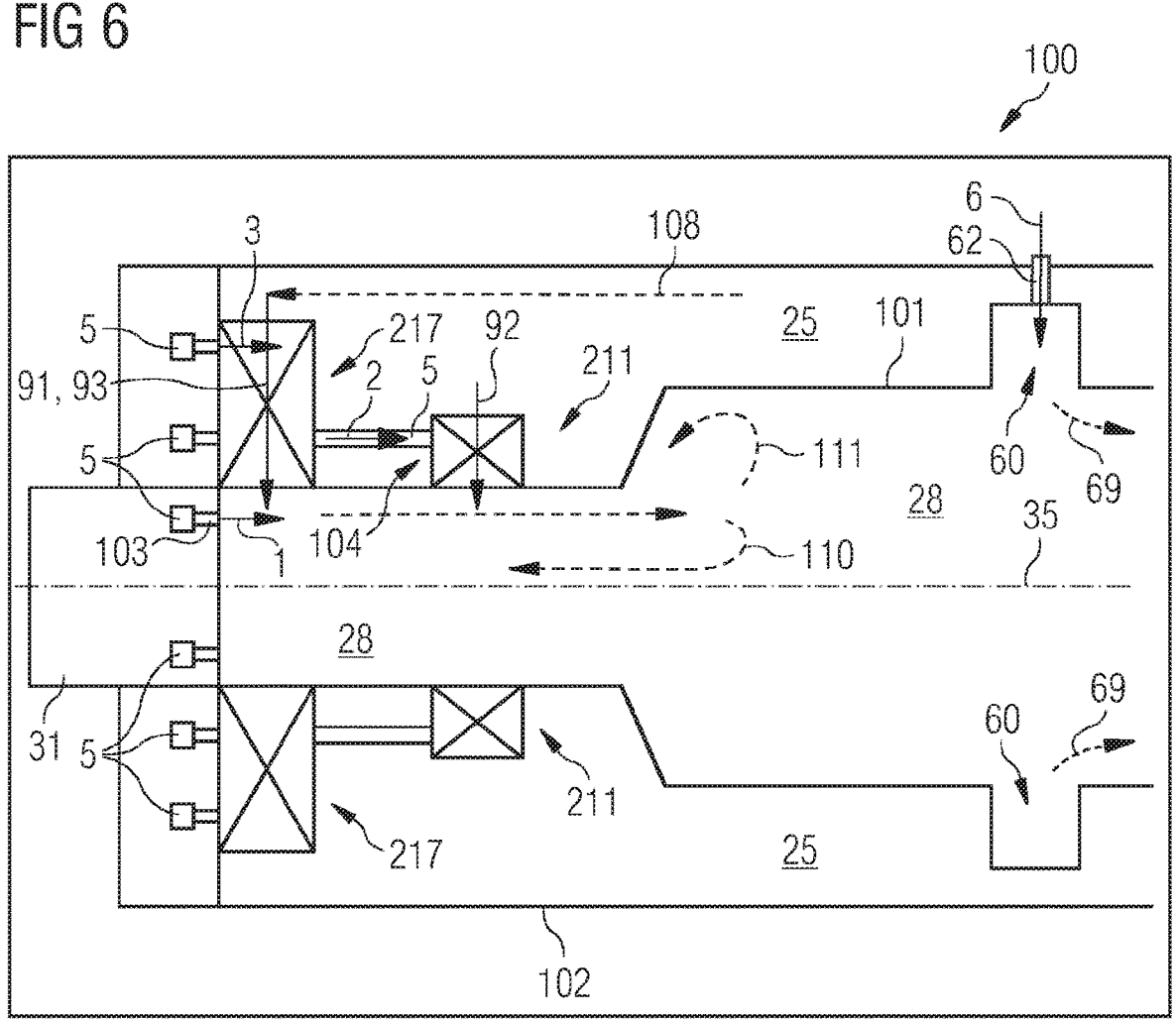
FIG. 6 schematically illustrates the combustor assembly of FIG. 5 depicting further structural details of the combustor assembly.
Figure 7:
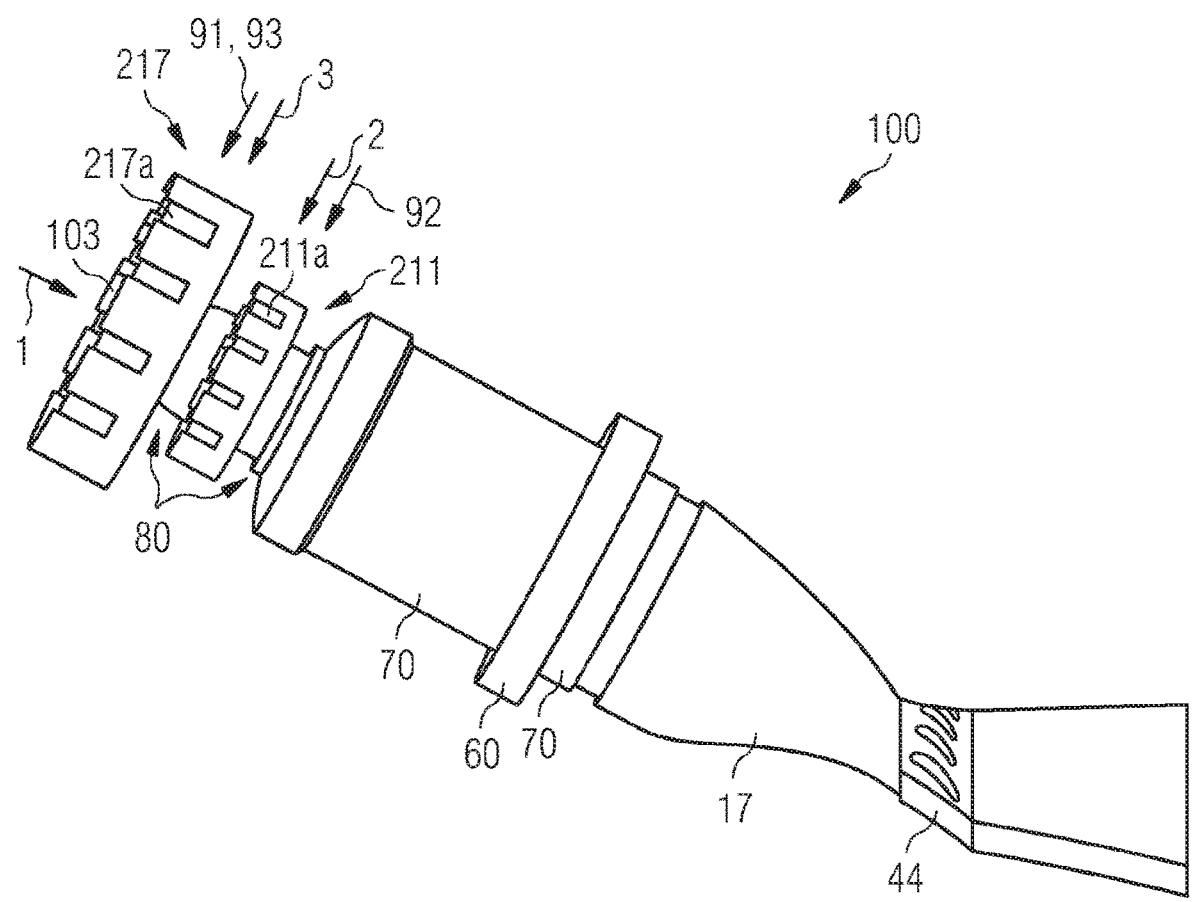
FIG. 7 schematically illustrates a perspective view of the combustor assembly of FIGS. 5 and 6; in accordance with aspects of the present technique.

As shown in FIGS. 5, 6 and 7, the assembly 100 includes the first injector 103, advantageously arranged at the burner plate 33 which co-located or co-positioned with the front face 81 of the prechamber 80, for injecting the first fuel 1, for example hydrogen, into the combustion chamber 28.

The assembly 100 further includes a swirler 211 for introducing a mixture of the second fuel 2 and the second air flow 92, and a swirler 217 for introducing a mixture of the third fuel 3 and the third air flow 93. The first and the second fuels 1,2 are introduced into part of the combustion chamber 28 defined by the prechamber 80. The swirler 211 is downstream with respect to the swirler 217, and thus the swirler 211 is referred to as the downstream swirler 211 and the swirler 217 is referred to as the upstream swirler 217. Within the downstream swirler 211 are the second injectors 104 positioned, for example on vanes 211a (depicted in FIG. 7) of the downstream swirler 211 or in a space between the vanes 211a of the downstream swirler 211. Within the upstream swirler 217 are the third injectors 105 positioned, for example on vanes 217a (depicted in FIG. 7) of the upstream swirler 217 or in a space between the vanes 217a of the upstream swirler 217. Thus within the downstream swirler 211 and the upstream swirler 217, the second air flow 92 and the third air flow 93 are mixed with the second fuel 2 and the third fuel 3, respectively.

A position P1, for example a central position at the prechamber 80, of the downstream swirler 211 is spaced apart in the axial direction, advantageously parallel to the axis 35, from the front face 81 of the prechamber 80 by a length a1. A position P2 of the upstream swirler 217 is spaced apart from the front face 81 of the prechamber 80 by a length a2 which is smaller than the length a1. The position P1 is thus axially spaced apart from the position P2 by a difference a1−a2.

As shown in FIG. 5, an external diameter d2 of the upstream swirler 217 may be greater than an external diameter d1 of the downstream swirler 211. The third injectors 105 are placed at or in vicinity of a radially outermost position in the upstream swirler 217, whereas the second injectors 104 are placed at or in vicinity of a radially outermost position in the downstream swirler 211, thereby ensuring a radial extent or part of the length $L_3$ of the third premixing stream line 114 is greater than a radial extent or part of the length $L_2$ of the second premixing stream line 113. In an exemplary embodiment of the assembly 100, the diameter d2 of the upstream swirler 217 is between 150 mm (millimetre) and 450 mm, more particularly about 250 mm, whilst the diameter d1 of the downstream swirler 211 is between 50 and 250 mm, more particularly about 100 mm.

As aforementioned, in the assembly 100 of the present technique including the embodiment of the assembly 100 depicted in FIGS. 5 and 6, the length $L_2$ of the second premixing stream line 113 is greater than the length $L_1$ of the first premixing stream line 112. Further, the length $L_3$ of the third premixing stream line 114 is greater than the length $L_2$ of the second premixing stream line 113. The assembly 100 including the upstream and the downstream swirlers 217,211 also includes, as aforementioned, the cavity 60 that maintains the trapped vortex 66, advantageously formed by ammonia 6 supplied to the cavity 60 via the ammonia supply 62.

The assembly 100 as depicted in FIGS. 5 and 6, and applicable for the embodiment of the assembly 100 depicted in FIGS. 2 to 4, may further include at least one temperature sensor 239 to measure a temperature in at least one region of the assembly 100, particularly one region of the combustion chamber 28. The temperature sensor 239 generates a measurement signal 241 which is supplied to a controller 245 which is also comprised in the assembly 100. The controller 245 receives the measurement signal 241 from one or more different regions within the assembly 100, particularly from one or more different location within the combustion chamber 28, and adjusts the mass flows of the first fuel 1, the second fuel 2 and/or the third fuel 3, in order to control the combustion process or combustion parameters based on the measured temperature or measured temperatures in different regions of the combustion chamber 28.

The assembly 100, as shown in FIG. 6, includes fuel galleries 5 that conduct or supply of the first fuel 1, the second fuel 2 and the third fuel 3 to the first injectors 103, the second injectors 104 and the third injectors 105, respectively, via different fuel galleries 5.

Also shown in FIG. 6, are the recirculation zone 110, 111 that stabilize the recirculation zone 109 or the flame 109. As aforementioned, the first injectors 103 may be part of the pilot burner 31.

The cavity 60 is present in all the aforementioned embodiments of the assembly 100 of the present technique. The location of the cavity 60 is as explained earlier in reference to FIG. 2. The cavity 60 may have various dimensions, for example in an embodiment, as shown in FIG. 4 however also applicable for one or more of other embodiments, of the assembly 100, an aspect ratio of the annular cavity is 1:1 i.e. an axial length $L_C$ of the annular cavity 60 is equal to a radial length $D_C$ of the annular cavity 60. The radial length $D_C$ represents a depth of the annular cavity 60.

While the present technique has been described in detail with reference to certain embodiments, it should be appreciated that the present technique is not limited to those precise embodiments. Rather, in view of the present disclosure which describes exemplary modes for practicing the invention, many modifications and variations would present themselves, to those skilled in the art without departing from the scope and spirit of this invention. The scope of the invention is, therefore, indicated by the following claims rather than by the foregoing description. All changes, modifications, and variations coming within the meaning and range of equivalency of the claims are to be considered within their scope.

The invention claimed is:

1. A method for operating a combustor assembly for a gas turbine engine, comprising:

combusting at least a first fuel in a singular reaction zone of a singular combustion chamber of the combustor assembly, wherein pollutant emissions are produced due to the combusting of the at least first fuel in the singular reaction zone; and injecting ammonia into the singular combustion chamber to form a trapped vortex in the singular combustion chamber, wherein the ammonia is injected such that the trapped vortex is formed in the singular combustion chamber at a position downstream of a reaction zone front in the singular reaction zone; and generating a reactive compound in the trapped vortex of injected ammonia, the reactive compound reacting with a flow of the pollutant emissions passing by the trapped vortex to abate discharge of the emissions from the combustor assembly.

2. The method according to the claim 1, wherein the first fuel comprises or is one of Hydrogen, a hydrocarbon, a mixture of hydrocarbons, Ammonia, and a combination thereof.

3. The method according to claim 1, wherein combusting at least the first fuel includes combusting at least a second fuel, and wherein the method further comprises:

injecting the second fuel into the singular combustion chamber such that the second fuel enters the singular reaction zone, wherein the second fuel is less reactive than the first fuel;

wherein combusting the first fuel comprises injecting the first fuel into the singular combustion chamber such that the first fuel enters the singular reaction zone;

wherein the first fuel and the second fuel are injected such that the first and the second fuels are premixed with a first and a second air flows forming a first and a second premixing stream lines, respectively, before the first and the second fuels enter the singular reaction zone; and wherein each of the first and the second premixing stream lines begins with a beginning of the premixing of the first and the second fuels with the respective air flow and ends at a location where the first and the second fuels enter the singular reaction zone, and wherein a length of the second premixing stream line is greater than a length of the first premixing stream line.

4. The method according to claim 3, wherein the first fuel comprises or is one of Hydrogen, a hydrocarbon, a mixture of hydrocarbons and a combination thereof, and wherein the second fuel comprises or is a hydrocarbon, a mixture of hydrocarbons, ammonia and a combination thereof.

5. The method according to claim 3, wherein combusting at least the first fuel includes combusting at least a third fuel, and wherein the method further comprises:

injecting the third fuel into the singular combustion chamber such that the third fuel enters the singular reaction zone, wherein the third fuel is less reactive than the second fuel;

wherein the third fuel is injected such that the third fuel is premixed with a third air flow forming a third premixing stream line before the third fuel enters the singular reaction zone; and wherein the third premixing stream line begins with a beginning of the premixing of the third fuel with the third air flow and ends at a location where the third fuel enters the singular reaction zone, and wherein a length of the third premixing stream line is greater than the length of the second premixing stream line.

6. The method according to claim 5, wherein the first fuel comprises or is Hydrogen;

wherein the second fuel comprises or is a hydrocarbon or a mixture of hydrocarbons; and wherein the third fuel comprises or is ammonia.

7. The method according to claim 1, wherein the combustor assembly comprises a combustor can, an annular cavity in the combustor can, and a prechamber having a prechamber exit, and wherein an axial distance of the annular cavity from the prechamber exit is equal to or greater than 50% of a length of the combustor can, wherein the ammonia is injected into the combustor can such that the trapped vortex is formed in the annular cavity of the combustor can.

8. A combustor assembly for a gas turbine engine, comprising:

a burner having a burner plate;

a prechamber having a prechamber;

a combustor can having a larger radial extent than the prechamber, wherein a singular combustion chamber is defined by the combustor can and the prechamber and wherein the singular combustion chamber is configured to combust at least a first fuel in a singular reaction zone, wherein pollutant emissions are produced due to combustion of the at least first fuel in the singular reaction zone;

one or more first injectors configured to inject the first fuel into the singular combustion chamber, wherein the combustor can comprises an annular cavity configured to maintain a trapped vortex, wherein an axial distance of the annular cavity from the prechamber exit is equal to or greater than 50% of a length of the combustor can; and an ammonia supply to inject ammonia into the annular cavity such that the trapped vortex is formed in the annular cavity of the combustor can, the annular cavity that maintains the trapped vortex being located downstream of a reaction zone front in the singular reaction zone, wherein a reactive compound is generated in the annular cavity injected with the ammonia, wherein the reactive compound reacts with a flow of the pollutant emissions passing by the trapped vortex in the annular cavity to abate discharge of the emissions from the combustor assembly.

9. The method according to claim 1, wherein the reactive compound is $NH_2$ and the pollutant emissions include at least one of $NO_x$ and $N_2O$.

10. The method according to claim 7, wherein the axial distance of the annular cavity from the prechamber exit is between 50% and 75% of the length of the combustor can.

11. The combustor assembly according to claim 8, further comprising:

one or more second injectors configured to inject a second fuel being less reactive than the first fuel into the singular combustion chamber, wherein the combustor assembly is adapted to premix the first and the second fuels with a first and a second air flows to form a first and a second premixing stream lines, respectively, before the first and the second fuels enter the singular reaction zone of the singular combustion chamber, wherein each of the first and the second premixing stream lines begins with a beginning of the premixing of the first and the second fuels with the respective air flow and ends at a location where the first and the second fuels enter the singular reaction zone, and wherein a length of the second premixing stream line is greater than a length of the first premixing stream line.

12. The combustor assembly according to claim 11, further comprising:
a first fuel supply configured to provide the first fuel to the one or more first injectors, and
a second fuel supply configured to provide the second fuel to the one or more second injectors,
wherein the first fuel comprises or is one of Hydrogen, a hydrocarbon, a mixture of hydrocarbons and a combination thereof, and wherein the second fuel comprises or is a hydrocarbon, a mixture of hydrocarbons, ammonia and a combination thereof.

13. The combustor assembly according to claim 11, further comprising:
one or more third injectors configured to inject a third fuel being less reactive than the second fuel into the singular combustion chamber,
wherein the combustor assembly is adapted to premix the third fuel with a third air flow to form a third premixing stream line before the third fuel enters the singular reaction zone of the singular combustion chamber, wherein the third premixing stream line begins with a beginning of the premixing of the third fuel with the third air flow and ends at a location where the third fuel enters the singular reaction zone, and
wherein a length of the third premixing stream line is greater than the length of the second premixing stream line.

14. The combustor assembly according to claim 13, further comprising:
a first fuel supply configured to provide the first fuel to the one or more first injectors,
a second fuel supply configured to provide the second fuel to the one or more second injectors, and
a third fuel supply configured to provide the third fuel to the one or more third injectors; wherein the first fuel comprises or is Hydrogen;
wherein the second fuel comprises or is a hydrocarbon or a mixture of hydrocarbons; and wherein the third fuel comprises or is ammonia.

15. The combustor assembly according to claim 13, wherein the one or more first injectors are arranged on a front face of the prechamber, and wherein the combustor assembly further comprises:
a downstream swirler having the one or more second injectors, wherein the downstream swirler is configured to introduce a mixture of the second fuel injected by the one or more second injectors and the second air flow into the singular combustion chamber; and
an upstream swirler having the one or more third injectors, wherein the upstream swirler is configured to introduce a mixture of the third fuel injected by the one or more third injectors and the third air flow into the singular combustion chamber;
wherein the downstream swirler and the upstream swirler are arranged at the prechamber.

16. The combustor assembly according to claim 8, wherein an aspect ratio of the annular cavity is 1:1.

17. The combustor assembly according to claim 8, wherein the axial distance of the annular cavity from the prechamber exit is between 50% and 75% of the length of the combustor can.

18. The combustor assembly according to claim 8, wherein the reactive compound is $NH_2$ and the pollutant emissions include at least one of $NO_x$ and $N_2O$.

* * * * *